W. B. WIGLE.
BULL AND CALF WHEEL.
APPLICATION FILED NOV. 21, 1916.
1,223,303.
Patented Apr. 17, 1917.
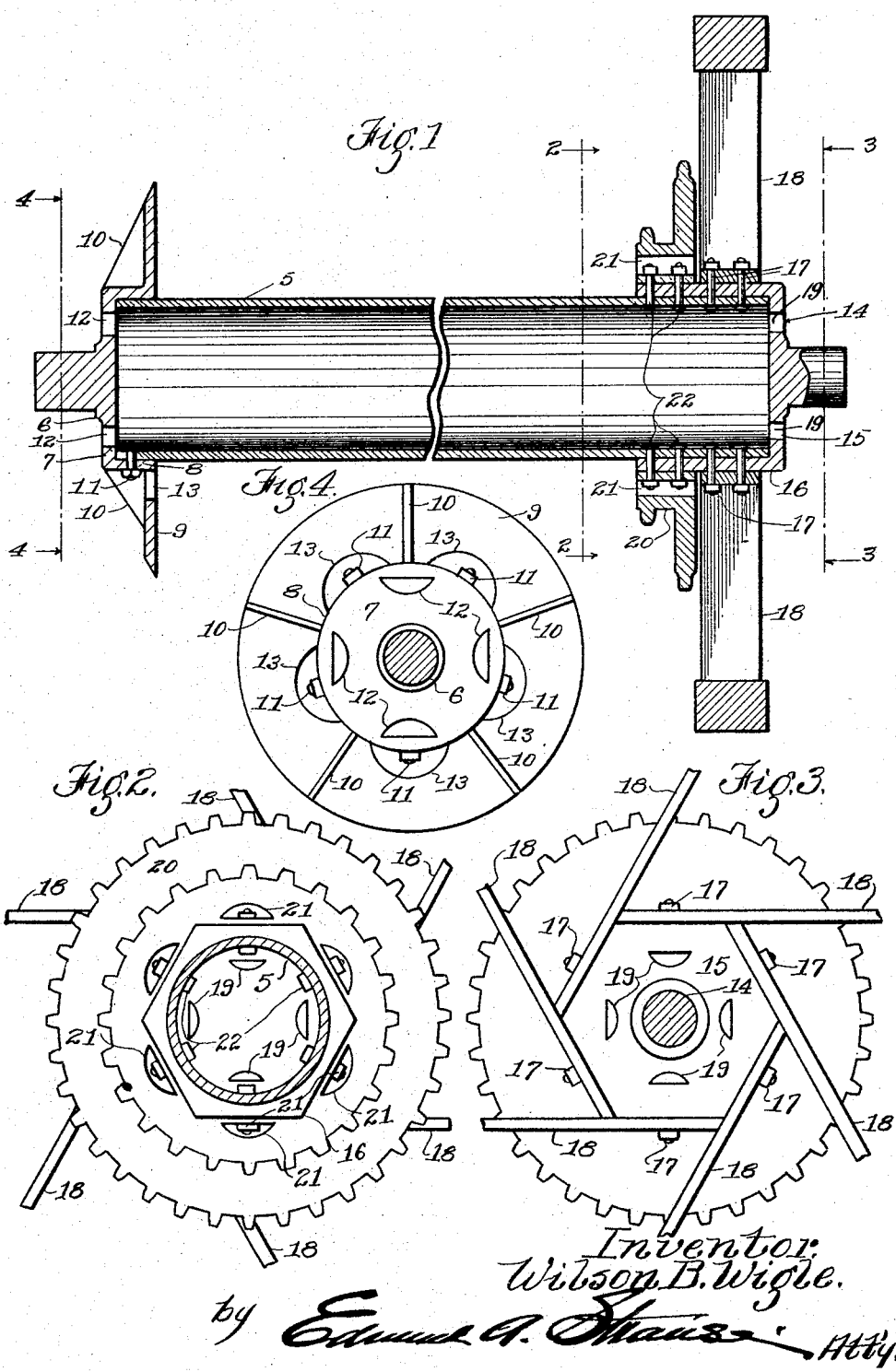
Inventor:
Wilson B. Wigle.
by Edward A. Strauss Atty.

UNITED STATES PATENT OFFICE.

WILSON B. WIGLE, OF FULLERTON, CALIFORNIA.

BULL AND CALF WHEEL.

1,223,303.     Specification of Letters Patent.     Patented Apr. 17, 1917.

Application filed November 21, 1916. Serial No. 132,529.

*To all whom it may concern:*

Be it known that I, WILSON B. WIGLE, a citizen of the Dominion of Canada, residing at Fullerton, in the county of Orange and State of California, have invented new and useful Improvements in Bull and Calf Wheels, of which the following is a specification.

This invention relates to a bull and calf wheel construction, and pertains especially to a composite construction of winding drum, gudgeon, brake wheel and driving wheel.

It is an object of this invention to provide a bull or calf wheel construction having a brake wheel and driving sprocket wheel which may be quickly and easily assembled.

In assembling a bull or calf wheel provided with brake wheels having tangential arms, it is the usual practice to bolt the arms to a hub mounted on the drum. In such constructions the bolts are difficult of access when assembling or disassembling the wheel. It is another object of this invention to provide a construction such that the bolts are easy of access.

I have also provided a double sprocket wheel for driving the shaft whereby two speeds may be obtained and the common bull rope eliminated. It is a further object of my invention to provide a construction such that in assembling and disassembling the bull or calf wheel the sprocket wheel may be readily set up and taken down.

I accomplish these objects by means of the embodiment of my invention illustrated in the accompanying drawing, in which:

Figure 1 is a longitudinal section through my improved bull or calf wheel, the drum being shown broken.

Fig. 2 is a fragmentary section as seen on the line 2—2 of Fig. 1.

Fig. 3 is a section as seen on the line 3—3 of Fig. 1.

Fig. 4 is a section as seen on the line 4—4 of Fig. 1.

The construction shown herein is either a bull or calf wheel according to its use, and will hereafter be called a bull wheel. It comprises a hollow shaft or drum 5 upon one end of which is mounted a gudgeon 6. Gudgeon 6 comprises a head 7, a tubular portion 8 which slips over the drum, and a flange 9. Flange 9 is braced by radial ribs 10. Bolt holes are provided in the tubular portion 8 and register with similar bolt holes in the drum 5. Bolts 11 extend through the bolt holes and secure the gudgeon 6 to the drum.

In placing the bolts in position, or in removing the same, it is desirable that they be so disposed that the heads may be held in tightening up the bolts. I have provided for this by placing hand holes 12 in the head 7; these holes being in a position such that access may be had to the interior of the drum for the insertion of a tool to engage the bolt heads. I have also provided openings or hand holes 13 in the flange 9 for easily getting at the nuts on the bolts. The hand holes 13 are disposed in alinement with the bolt holes. The ease of assembling the gudgeon 6 and the drum 5 is obvious from the construction just described.

Upon the end of the drum 5 opposite to gudgeon 6 is mounted a brake wheel and a sprocket wheel. A gudgeon 14 is slipped over the end of drum 5 and secured thereto. The gudgeon 14 comprises a head 15, and a brake wheel hub 16. The brake wheel hub is of polygonal form and preferably hexagonal. Registering bolt holes in the drum and hub are provided for receiving bolts 17 which secure brake wheel arms 18 to the hub. The brake wheel arms 18 are secured upon the hexagonal faces so that they are tangential. It is now the common practice to use an octagonal form of hub and eight arms. With eight arms the angle and the space between the arms is so small as to make the bolts difficult of access. By using a hexagonal form of hub and six arms sufficient room is provided for getting at the bolts. In order to provide means for getting at the heads of the bolts and holding the same in assembling the wheel, I have provided hand holes 19 in the head 15. These hand holes like those in the gudgeon 6 allow the insertion of a tool to grip the head of the bolts.

The hub 16 extends inwardly beyond the brake wheel arms and mounted thereon is a double sprocket 20. The sprocket 20 is provided with a hub, the bore of which conforms to the hexagonal brake wheel hub, and the sprocket wheel is slipped over the brake wheel hub. Extending through the sprocket wheel hub are openings 21. The sprocket wheel hub is provided with bolt holes which extend from the openings 21 to the inner surface of the hub and register with bolt holes in the drum 5. Bolts 22 are disposed in the registering bolt holes. The heads of the bolts 22 are accessible through hand holes 19 and the nuts are accessible through the openings 21 so that proper tools may be inserted in assembling or disassembling the wheel.

It is obvious that I have provided details of structure which avoid the use of keys in assembling the brake wheel, gudgeon and drum, and whereby the bolts or members for securing the several parts together are easily accessible. By using bolts which pass through the drum, gudgeons and brake wheel arms, I am enabled to secure these parts together in one operation.

The bull wheel shown herein is provided with a double sprocket which is connected to sprockets on the band wheel shaft by means of the sprocket chains. By this construction I am enabled to secure two speeds of the bull wheel.

What I claim is:

1. In a device of the class described, the combination of a drum, a gudgeon secured thereto comprising a brake wheel hub slipped over said drum and an end head, said drum and hub having registering bolt holes, said head having hand holes therein, said hub being of polygonal form, brake wheel arms mounted on the polygonal faces of said hub, and bolts extending through said holes and said arms securing the latter to said hub.

2. In a device of the class described, the combination of a hollow drum, a gudgeon secured thereto comprising a brake wheel hub slipped over said drum, and an end head, said drum and hub having registering bolt holes, said head having hand holes therein, said hub being of polygonal form, brake wheel arms mounted on the polygonal faces of said hub, bolts extending through the holes in said arms, and through holes in said hub securing the arms to said hub, a sprocket wheel having a hub slipped over said brake wheel hub, the hub of said sprocket having bolt holes therein registering with holes in said brake wheel hub and said drum, and bolts disposed in said last mentioned holes securing said sprocket wheel to said drum.

3. In a device of the class described, the combination of a hollow drum, a gudgeon secured thereto comprising a brake wheel hub slipped over said drum and an end head, said drum and hub having registering bolt holes, said head having hand holes therein, said hub being of polygonal form, brake wheel arms mounted on the polygonal faces of said hub, bolts extending through holes in said arms, and through holes in said hub securing the arms to said hub, a sprocket wheel having a hub slipped over said brake wheel hub, the hub of said sprocket having bolt holes therein registering with holes in said brake wheel and said drum, bolts disposed in said holes securing said sprocket wheel to said drum, said sprocket wheel hub having hand hole openings extending therethrough in which the ends of the securing bolts are disposed.

In witness that I claim the foregoing I have hereunto subscribed my name this 3rd day of November, 1916.

WILSON B. WIGLE.

Copies of this patent may be obtained for five cents each, by addressing the "Commissioner of Patents. Washington, D. C."